US006882708B1

(12) United States Patent
Bedingfield et al.

(10) Patent No.: US 6,882,708 B1
(45) Date of Patent: Apr. 19, 2005

(54) REGION-WIDE MESSAGING SYSTEM AND METHODS INCLUDING VALIDATION OF TRANSACTIONS

(75) Inventors: James Carlton Bedingfield, Lilburn, GA (US); Neil Gilmartin, Atlanta, GA (US); Maria Adamczyk, Alpharetta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/513,005

(22) Filed: Feb. 25, 2000

Related U.S. Application Data
(60) Provisional application No. 60/121,893, filed on Feb. 26, 1999, and provisional application No. 60/121,929, filed on Feb. 26, 1999.

(51) Int. Cl.[7] ................................................ H04M 1/64
(52) U.S. Cl. .................................. 379/88.18; 379/88.25
(58) Field of Search ............................. 379/67.1, 88.17, 379/88.18–88.23, 88.25–88.27, 219, 220.01, 221.01–221.02, 221.08, 221.09, 221.12, 221.14

(56) References Cited

U.S. PATENT DOCUMENTS

| | | | |
|---|---|---|---|
| 4,930,152 A | | 5/1990 | Miller |
| 4,933,967 A | | 6/1990 | Lo et al. |
| 5,058,152 A | | 10/1991 | Solomon et al. |
| 5,353,331 A | | 10/1994 | Emery et al. |
| 5,361,295 A | | 11/1994 | Solomon et al. |
| 5,425,091 A | | 6/1995 | Josephs |
| 5,493,607 A | | 2/1996 | Arumainayagam et al. |
| 5,521,969 A | | 5/1996 | Paulus et al. |
| 5,572,578 A | * | 11/1996 | Lin et al. ................. 379/88.18 |
| 5,572,583 A | | 11/1996 | Wheeler et al. |
| 5,631,948 A | * | 5/1997 | Bartholomew et al. .. 379/88.18 |

(Continued)

FOREIGN PATENT DOCUMENTS

| | | | |
|---|---|---|---|
| EP | 0255325 | 2/1988 | |
| EP | 0412799 | 2/1991 | |
| EP | 0507125 | 10/1992 | |
| EP | 0543235 | 5/1993 | |
| EP | 0624967 | 11/1994 | |
| EP | 0662762 | 7/1995 | |
| EP | 0782304 A2 | 7/1997 | |
| EP | 0782315 A2 | 7/1997 | |
| EP | 0782316 A2 | 7/1997 | |
| EP | 0813162 A2 | 12/1997 | |
| EP | 0825752 A2 | 2/1998 | |
| EP | 0 841 796 A2 | 5/1998 | ............ H04M/3/50 |
| EP | 0 843 453 A2 | 5/1998 | ............ H04M/3/50 |
| EP | 0886228 A2 | 12/1998 | |
| EP | 0 841 796 A3 | 8/1999 | ............ H04M/3/50 |
| WO | WO 97/08901 | 3/1997 | |

OTHER PUBLICATIONS

"Die T–Net–Box–der Anrufbeantworter im Netz", XP–000861610, 1998.

(Continued)

*Primary Examiner*—Roland G. Foster
(74) *Attorney, Agent, or Firm*—Thomas, Kayden, Horstemeyer & Risley LLP

(57) ABSTRACT

Methods and systems are disclosed that allow for the exchange of voice mail messages between different VMSs of different service providers and/or in different networks by the transmission of such messages through a data network using a standard protocol of the data network. Methods and systems also are disclosed that validate message transactions among subscribers receiving regional messaging services over the PSTN. The subscribers are located in different geographic areas and may be provided their voice, facsimile or data messaging services by different companies. The present invention validates passing messages (data) among customers of potentially different companies located in different areas by assessing the validity of the transaction in light of a number of conditions, including applicable regulatory or business conditions.

14 Claims, 4 Drawing Sheets

U.S. PATENT DOCUMENTS

| | | | |
|---|---|---|---|
| 5,680,442 A | 10/1997 | Bartholomew et al. | |
| 5,684,862 A | 11/1997 | Finnigan | |
| 5,692,033 A | 11/1997 | Farris | |
| 5,712,903 A | 1/1998 | Bartholomew et al. | |
| 5,717,742 A | 2/1998 | Hyde-Thomson | |
| 5,740,230 A | 4/1998 | Vaudreuil | |
| 5,740,231 A | 4/1998 | Cohn et al. | |
| 5,742,763 A | 4/1998 | Jones | |
| 5,742,769 A | 4/1998 | Lee et al. | |
| 5,742,905 A | 4/1998 | Pepe et al. | |
| 5,764,747 A | 6/1998 | Yue et al. | |
| 5,768,348 A | 6/1998 | Solomon et al. | |
| 5,790,637 A | 8/1998 | Johnson et al. | |
| 5,812,639 A * | 9/1998 | Bartholomew et al. | 370/352 |
| 5,812,670 A | 9/1998 | Micali | |
| 5,832,072 A | 11/1998 | Rozenblit | |
| 5,832,221 A | 11/1998 | Jones | |
| 5,838,768 A | 11/1998 | Sumar et al. | |
| 5,848,132 A | 12/1998 | Morley et al. | |
| 5,905,774 A | 5/1999 | Tatchell et al. | |
| 5,930,479 A | 7/1999 | Hall | |
| 5,940,478 A | 8/1999 | Vaudreuil et al. | |
| 5,999,595 A * | 12/1999 | Shaffer et al. | 379/88.18 |
| 6,002,751 A * | 12/1999 | Shaffer | 379/88.18 |
| 6,005,845 A | 12/1999 | Svennesson et al. | |
| 6,005,922 A * | 12/1999 | Longster et al. | 379/88.18 |
| 6,061,432 A * | 5/2000 | Wallace et al. | 379/88.18 |
| 6,064,723 A | 5/2000 | Cohn et al. | |
| 6,148,069 A | 11/2000 | Ekstrom et al. | |
| 6,169,795 B1 | 1/2001 | Dunn et al. | |
| 6,181,780 B1 * | 1/2001 | Finnigan | 379/67.1 |
| 6,209,100 B1 | 3/2001 | Robertson et al. | |
| 6,226,359 B1 * | 5/2001 | Montgomery et al. | 379/67.1 |
| 6,233,318 B1 | 5/2001 | Picard et al. | |
| 6,243,374 B1 | 6/2001 | White et al. | |
| 6,292,799 B1 * | 9/2001 | Peek et al. | 707/10 |
| 6,301,349 B1 | 10/2001 | Malik | |
| 6,317,484 B1 | 11/2001 | McAllister | |
| 6,330,079 B1 | 12/2001 | Dugan et al. | |
| 6,339,640 B1 | 1/2002 | Chen et al. | |
| 6,418,200 B1 * | 7/2002 | Ciccolella et al. | 379/88.18 |

OTHER PUBLICATIONS

"Voice Services on the Intelligent Network: Intelligent Peripherals and Service Nodes", F. Bosco, XP–000607359, Aug. 1992.

"The Belcore and ITU–T Call Model Operations", XP–002141946, 1998.

"Transactions in Intelligent Networks", XP–002141947, 199.

"General Recommendations on Telephone Switching and Signalling—Introduction to Intelligent Network Capability Set 1", International Telecommunication Union, XP–002141945, Mar. 1993.

"An Enhanced Message Networking Topology: Multimedia Messaging with the Intuity™ Interchange Server," Bell Labs Technical Journal, Apr. –Jun. 1998, pp 124–135.

* cited by examiner

REGION-WIDE MESSAGING SYSTEM AND METHODS INCLUDING VALIDATION OF TRANSACTIONS

RELATED APPLICATIONS

This application claims priority to and the benefit of two prior filed copending and commonly owned provisional applications, referenced as: (1) "Method and System for Validating Transactions Within a Regional Messaging System," filed in the United States Patent and Trademark Office on Feb. 26, 1999, assigned Application No. 60/121,893; and (2) "Region Wide Voice Mail Messaging System," filed in the United States Patent and Trademark Office on Feb. 26, 1999, assigned Application No. 60/121,929. Both referenced provisional applications are incorporated herein by reference.

FIELD OF THE INVENTION

The present invention relates to messaging systems, and particularly, relate to methods and systems for implementation of a region-wide messaging system and for the validation of certain messaging transactions in the messaging system.

BACKGROUND

Telephone answering machines are used by many consumers to collect messages that are received while the consumers are unavailable. But such answering machines have limitations that pose inconveniences. For example, a conventional telephone answering machine generally will not take a message from a caller when the called party is already engaged in a call. The caller must call again even though the called party has an answering machine. Some of the limitations of telephone answering machines have been overcome by network voice mail services typically offered by telecommunications service providers. For example, generally, a network voice mail service will take a message from a caller when the called party is already engaged in a call.

While telephone answering machines and network voice mail services are used by consumers in the home and in small businesses, other telecommunication products have been developed to serve larger businesses, and other institutions such as schools, hospitals, government offices, and the like. These other telecommunication products include telecommunications systems having advanced messaging features. These advanced messaging features typically provide a user with more options than a conventional telephone answering machine or network voice mail service.

In particular, such a telecommunications system may provide a user with several options to respond to receipt of a message. The recipient may reply to the message, forward the message to one or more users of the system, and/or may include another message as an attachment to the reply or forwarded message. In some systems, a recipient may respond to receipt of a message by having the system call the originator's number so the recipient may speak directly to the originator. Some telecommunications systems accept facsimile (fax) messages and allow a recipient to direct a fax message to a printer for printing or computer for display.

As noted, these telecommunications systems with advanced messaging features are used in larger institutions where such messaging features allow the users in these larger institutions to communicate with each other in more ways than simply by leaving messages for each other.

Nevertheless, such telecommunications systems with advanced messaging features have their drawbacks as well. A principal drawback of such telecommunications systems is that they are limited in scope to the institutions in which they serve. Persons outside the institution having the telecommunications system cannot take advantage of the advanced messaging features.

For example, a business having a telecommunications system with advanced messaging features has provided its employees with choices in communicating with each other. But an employee of the business who receives a message from outside the business (such as from a customer) cannot make use of the choices in responding to the message from the outside. The person on the outside who left the message for the employee is not included in the telecommunications system with the advanced messaging features that is deployed in the business.

Considering the three types of products discussed (telephone answering machines, network voice mail services, and telecommunications systems having advanced features), there are needs of users left unsatisfied by these products. For subscribers to network voice mail services, and especially for users of telephone answering machines, there is a need for an apparatus, system, or method that will provide the functionality of the telephone answering machines and the network voice mail services as well as provide the advanced messaging features of the telecommunications systems generally used in larger institutions. But it is not enough to satisfy the needs of users by providing telecommunications systems having advanced features to subscribers of network voice mail services and/or users of telephone answering machines. It is not satisfactory because the advanced messaging features of such systems are available only to persons associated with the institution having deployed the particular telecommunications system. Thus, there is a need for an apparatus, system, and/or method that provides a user with advanced messaging features and that may be used in connection with communications to other users even if the other users are not associated with a common institution. In sum, there is a need for an apparatus, system, and/or method that implements a messaging system across a region for the exchange of communications between and among users of the region.

Multiple obstacles exist to providing users with a region-wide and feature-rich messaging system. The region-wide messaging system may include multiple service providers with each service provider having one or more voice mail platforms, etc. As a result, technical, regulatory, and business constraints may prevent the exchange of messages in the region-wide messaging system between users who reside in different states or areas of the region, and/or who are served by different service providers. For instance, in the United States, some state and/or federal regulations prevent certain categories of service providers from transferring telephone calls, and possibly messages, across state boundaries and/or across LATAs ("Local Access Transport Areas"). Also, even if users are in the same state or LATA, a user may choose to subscribe to messaging service from a service provider different from another user's service provider. Unless service providers have reciprocal business agreements for accepting each others' traffic within the region-wide messaging system, message exchange between the users may not be possible or may be possible only accompanied by a large toll charge. Similar regulatory restrictions and business considerations may apply in other countries and/or in messaging systems that operate across national borders and are included in a region-wide messaging system.

Some of the obstacles posed to a region-wide messaging system by regulatory, technical, and business constraints can best be illustrated by an example. Assume two people (Oscar and Rachel) subscribe to voice mail service provided through a region-wide messaging system. Oscar lives in Louisiana. In Louisiana, BellSouth provides Oscar with local telephone service, and Oscar has chosen AT&T to provide voice mail service through the region-wide messaging system. Oscar wishes to originate or leave a message for Rachel, the message's recipient who lives in Georgia. In Georgia, BellSouth provides Rachel with local telephone service, and Rachel has chosen BellSouth to provide voice mail service. Oscar calls Rachel, who is unavailable, so Rachel's voice mail service plays a pre-recorded message and prompts Oscar for his message. Oscar leaves a message. Rachel eventually retrieves the message, but instead of actually talking with Oscar, Rachel would prefer to dash off a quick reply by using her voice mail service.

To carry out Rachel's desire to reply to Oscar's message, Rachel's voice mail service (BellSouth) must determine whether Oscar has a voice mail service, and if so, how to communicate with Oscar's voice mail service. To determine "how" to communicate, BellSouth needs to have technical information relating to Oscar's voice mail service. But obtaining this technical information may not be enough. BellSouth may need to have business and regulatory information relating to Oscar's voice mail service and relating to Rachel's reply to Oscar's message.

BellSouth needs to make sure that its transport of Rachel's reply to Oscar does not violate any regulations governing transfer of messages among various states and regions. Rachel's reply message will travel across several state and LATA boundaries to get into Oscar's voice mailbox operated by his voice mail service. Some states may prohibit transport of a message across boundaries unless the service provider has been pre-authorized to do so; other states may consider the message unregulated and charge differently than for a regulated message. In sum, there is a need for service providers participating in a region-wide messaging system to be able to account for multiple, varying regulatory restrictions in order to prevent unauthorized message transactions or at least to take some action or provide some information with respect to the unauthorized message transactions.

Finally, if BellSouth determines how to send Rachel's reply to Oscar's voice mail service, and if BellSouth determines the reply is allowed by applicable regulations, then BellSouth still must determine whether Oscar's voice mail service will accept the message from BellSouth. In order to do so, voice mail services may need to adapt their respective systems to accept messages in a different format or pursuant to a different protocol than those usually received. A voice mail service is unlikely to go to that expense and trouble absent reciprocity, as outlined in an appropriate agreement among voice mail services.

In short, before a message may be transferred between or among multiple messaging platforms located in different regions and possibly operated by different companies in a region-wide messaging system, there is a need for the transaction associated with the message to be validated. Such validation requires identification of the location(s) to which the message is being transferred, resolution of whether regulations allow the transfer, and determination of whether and how particular business agreements among the involved service providers affect the transfer.

SUMMARY OF THE INVENTION

This summary of the invention uses certain terms explained elsewhere in this document, including terms in the "Detailed Description" section.

Advantageously, the present invention provides a messaging system and methods such that messages may be exchanged between and among users in a region even though the users subscribe to messaging services from different service providers and/or are provided with messaging services from different messaging servers ("MSs"). The RWM system and methods allow for the exchange of such messages between different MSs by the transmission of such messages through a data network using a standard protocol of the data network. In one implementation, the MSs are voice mail platforms configured to couple to (1) the AIN SS7 as an intelligent peripheral device and (2) one another via a TCP/IP network. By integrating the MSs into the AIN network, the present invention takes advantage of the deployed architecture of that network to support the functionality described. In other words, instead of simply delivering a call to a standard voice mail platform for that platform to support by itself certain user options such as operator revert or the like, this invention allows the AIN to retain full control of the voice mail call. That architecture centralizes not only deployment of new applications for users onto an SCP, but also allows centralization of database information.

The present invention also provide validation of certain messaging features that are used on a messaging system deployed on a regional basis. Before or after authorizing and implementing such features, the messaging system may determine 1) the identity of the message sender and recipient; 2) that both sender and recipient may receive messages sent according to this invention and/or 3) whether regulations, business agreements among service providers, the service providers' customer data, or combinations thereof allow the desired messaging transaction. The present invention provides a method and system for performing a validation process that resolves these issues.

This invention a region-wide messaging system that uses more than one messaging server ("MS"), such as a voice mail platform. Each MS may be located respectively in a different geographic region and operated by a different service provider. A caller initiates a message in a first MS to be delivered to a subscriber served by a second MS. The first MS queries a directory by forwarding at least the subscriber's telephone number. Using the telephone number of the recipient (subscriber), as well as either the sender's phone number or information identifying the first MS that the first MS forwards to the directory, the directory applies various tables and rules to determine the service provider and location (by, e.g., LATA, state or other subdivision) for each of the sender and recipient. If regulations allow messaging transactions between those locations, and if the first and second MSs are operated by different service providers, then a determination is made as to whether one or more agreement(s) exist(s) between the different service providers that will allow the transaction to be validated and go forward. These determinations can, of course, also be carried out after the messaging transaction in order, for instance, to determine the billing rate for the particular messaging transaction.

A region-wide messaging system may also allow subscribers to activate a message delivery service for the delivery of messages to a group of recipients, including subscribers and non-subscribers of service providers associated with the region-wide messaging system. A message to a subscriber is delivered only if the proposed transaction associated with the message is validated. A message to a non-subscriber need not be validated because such a message is delivered by a telephone call to the non-subscriber's voice mailbox, a function allowed under existing regulations.

Whether replying, forwarding or distributing a message to one or more subscribers or non-subscribers, the destination address (e.g., telephone number) is collected. For a reply message to a non-subscriber, the non-subscriber's address (e.g., telephone number) may be discerned by analyzing the calling line identification information provided by the telephone network when the non-subscriber leaves the original message. For a reply message to a subscriber, the subscriber's telephone number is collected from the originating address (e.g., telephone number) of the message left by the subscriber.

As noted, the destination telephone number as well as either the originating telephone number of MS identity are provided to the directory, which allows the present invention thereafter to determine whether business and regulatory rules allow the messaging transaction to go forward. Additionally, the destination telephone number allows a verification message to be provided to the user originating the transaction. The verification message alerts the user both to the validity of the transaction and to the identity of the message's recipient. For subscribers, the verification message may be formulated by using the destination telephone number to retrieve, via the directory, the subscriber's spoken name or other audio message; for non-subscribers, the verification message may simply be the telephone number.

One type of region-wide messaging system with which the present invention may be used is deployed over a public switched telephone network (PSTN) that uses various Advanced Intelligent Network ("AIN") components. For instance, commercially available voice mail platforms may be reconfigured as messaging servers and provided with appropriate AIN functionality so that the messaging servers act as an intelligent peripheral within the AIN. The messaging servers interface with another, directory server, such as Lightweight Directory Access Protocol ("LDAP") directory servers available from various suppliers and which may be configured to hold the directory information. Or, Service Control Points ("SCPs") could be reconfigured with LDAP server functionality and adapted to hold the one or more directories and databases that are used with the present invention. In any event, each directory server may be equipped with a Regional Messaging Directory ("RMD") that indexes telephone numbers to identify the messaging server (MS) serving a particular telephone number or group of telephone numbers. One or more other tables in the directory may list: (a) the location of particular MSs, by LATA, state or other subdivision; (b) the rules governing message transactions among inter-state, inter-LATA or other inter-divisional MSs; (c) the business agreement rules governing the exchange of messages between service providers and others associated with the region-wide messaging system; and (d) certain flags that indicate whether messages may be sent to or from a particular subscriber based on a variety of criteria ranging from whether the subscriber has paid his bills to a subscriber's particular language.

A preferred embodiment of a region-wide messaging system in which the present invention may be deployed uses a transmission control protocol/internet program (TCP/IP) network to allow transfer of messages among various MSs. Queries to and responses from the LDAP Server on which the RMD resides may be executed using internet protocols, such as the Lightweight Directory Access Protocol ("LDAP") that is a TCP/IP-based derivative of the X.500 electronic mail delivery service. Skilled persons will recognize that while a region-wide messaging system may use TCP/IP and LDAP protocols to query directories and other network elements, other protocols may be used, such as the signaling system 7 (SS7). Indeed, SS7 protocol would allow implementers to take advantage of the reliability and known capability of an established telecommunications protocol.

In another aspect of the invention, a region-wide messaging system is facilitated by allowing subscribers to reply to received messages by authenticating the reply recipient and the proposed reply transaction. The subscriber's MS queries the LDAP Server's RMD via messages in LDAP protocol that provide the RMD both the subscriber's telephone number and the reply recipient's telephone number. (As used herein, the telephone number is assumed to identify the voice mailbox, although other identifiers may be used). The RMD determines the identity of each MS associated with the telephone numbers provided. Using a number of tables, the RMD ascertains the geographic location of each MS and whether regulatory rules allow a message transfer between MSs in those locations. Assuming a positive response, the RMD determines whether, if the MSs are operated by different service providers, those service providers' agreements allow exchange of messaging traffic. The RMD provides the subscriber's MS with this information, and the MS, in turn, authorizes or stops the proposed messaging transaction.

Optionally, the present invention may determine whether a reply message is possible before the subscriber attempts such a reply. For example, when a subscriber accesses the voice mail service for messages, a message is played to the subscriber. During message retrieval, the subscriber's MS queries the RMD to determine whether a reply may be made to the message originator, using generally the same procedure as described above. After validation of a reply, the MS informs the subscriber that a reply may be made, perhaps through an announcement of "Would you like to reply to [spoken name of originator]?"

Similarly, when a subscriber wishes to formulate a message for multiple recipients, the subscriber accesses the voice mail service, prepares the message and enters the list of destination telephone numbers. The subscriber's MS formulates an LDAP query that provides the LDAP Server with the telephone number(s) of the recipient(s) for the message, as well as the subscriber's telephone number. Upon receiving those numbers, the LDAP Server determines whether they are numbers of subscribers who have voice mail service through the region-wide message system. The LDAP Server then routes the numbers to the RMD. The RMD compares the numbers to an index and determines the identity of the serving MS for each number. Using other tables and indexes, the RMD determines the location of each MS, whether regulatory rules permit messaging transfers between the subscriber's (i.e., the message sender) MS and the recipient's MS, and whether, if the two MSs are operated by different service providers, business agreements between the service providers allow the recipient's MS to accept messages from the subscriber. That information is returned to the subscriber's MS, which alerts the subscriber to any telephone numbers to which messages may not be delivered. For validated telephone numbers, the messaging transaction proceeds.

Validation of messaging transactions may be adapted to particular situations. For instance, if the region-wide messaging system is deployed in multiple countries, only some of which allow international messaging transactions, the present invention can be adapted to validate those transactions also. Further, it is anticipated that the validation criteria may be modified or changed as regulations from regulatory bodies and agreements among service providers change.

Indeed, the examples above are only a few of the ways in which proposed message transactions may be validated. Other validation criteria may be selected. For instance, the directory may indicate a subscriber has paid his or her bills and can proceed with messaging transactions (e.g., if the subscriber has not paid the system may reject the message. Another important billing feature may be to alert the user to whether the message will incur an additional fee, for instance because the message exceeds the number of messages purchased by the user for that particular billing cycle. Or, the directory may indicate the sender's and receiver's spoken language or other shared features, which the present can compare. Another important criteria on which to validate the message transaction may be to determine whether the user has paid his bill or is otherwise authorized to use the messaging service. These and other validation criteria may be added to the directory. Thereafter, the present invention validates the transaction based on the new or added validation criteria.

Although the embodiment described above and elsewhere in this document describes deploying the directory upon an LDAP Server, persons skilled in this field will recognize that other platforms can be used to perform that functionality. For instance, the directory can be integrated into a workstation that in turn can couple to the public switch telephone network ("PSTN"). Additionally, the present invention can be adapted for use with IP addresses instead of telephone numbers.

This invention accordingly aims to achieve at least one, multiple or combinations of the following objectives:

To provide a method or system for providing messaging subscribers a convenient and reliable way of exchanging information with other users of the region, whether or not the other users are subscribers associated with the region-wide messaging system.

To provide a method or system for validating messaging transactions within a region-wide messaging system.

To provide a method and system for validating whether regulations allow a particular messaging transaction.

To provide a method or system for validating whether agreements among different service providers allow transfer of messages among those service providers.

To provide a method or system for validating whether both regulations and agreements among different messaging service providers allow a proposed messaging transaction.

To provide a method or system for querying a database to validate a particular messaging transaction.

To provide a method or system using internet protocols in querying a directory during validation of messaging transactions.

To provide a method or system capable of either blocking messaging services for or to certain subscribers or billing certain subscribers for particular messaging transactions.

To provide a region wide messaging system that may be deployed on its own or in conjunction with the existing networks like the PSTN or internet networks.

Other objects, advantages and uses for the present invention will become apparent upon reviewing the remainder of this document, including the drawings and attachments.

DETAILED DESCRIPTION

Figure 1:
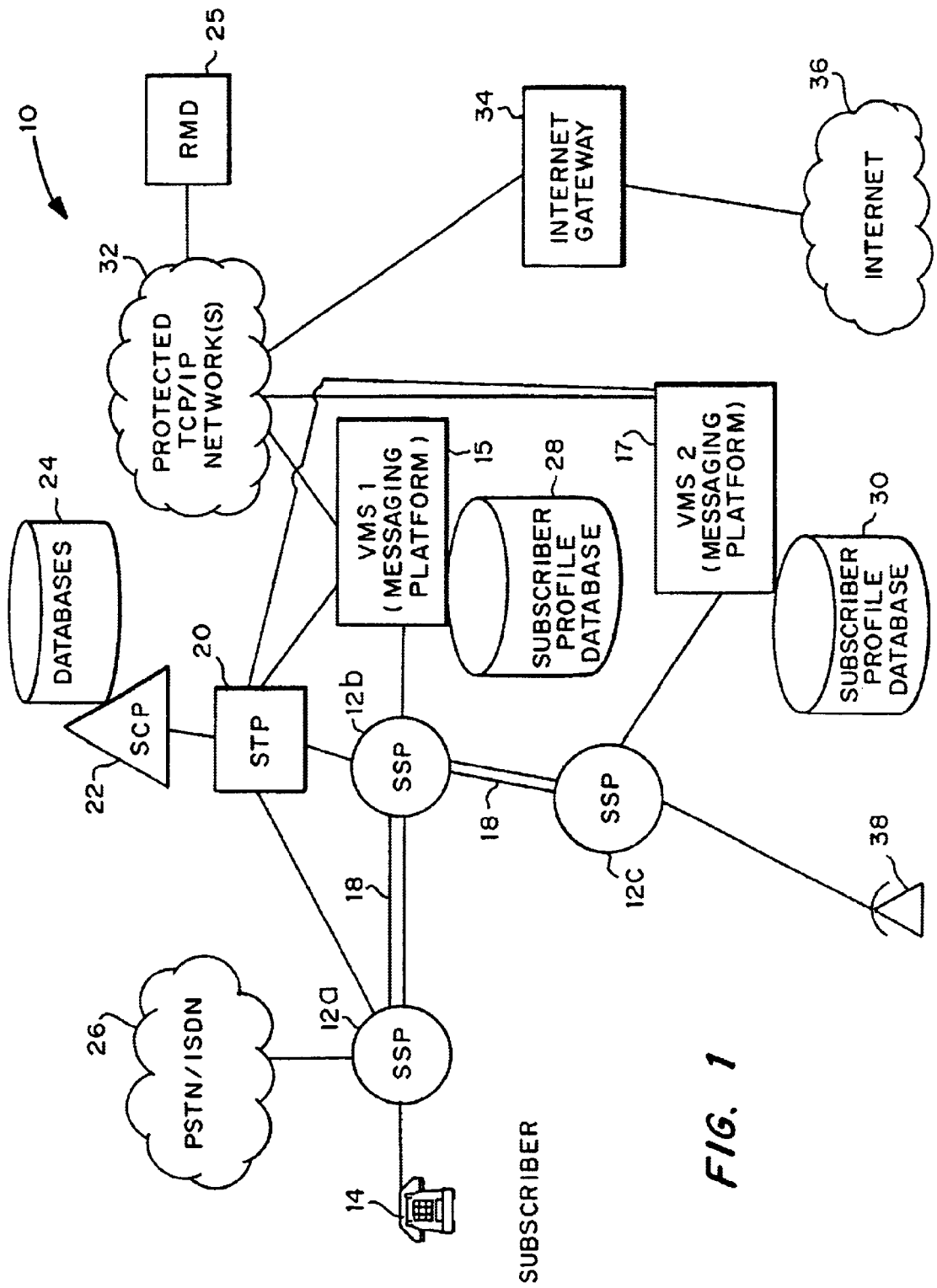
FIG. 1 is a block diagram of an exemplary embodiment of a region-wide messaging system in which the method and system of the present invention may be deployed.

Reference will now be made in detail to exemplary embodiments of the invention, examples of which are illustrated in the accompanying drawings. Wherever possible, the same reference numbers will be used throughout the drawings to refer to the same or like parts.

Terminology

Before describing the drawings and exemplary embodiments in more detail, several terms are described below in an effort to clarify the terminology used in this document. Additional and fuller understanding of these terms will be clear upon reading this entire document:

Caller: A caller is a participant in a messaging transaction who has placed a telephone call that may result in a message to a subscriber of a region-wide messaging system. A caller may also subscribe to the region-wide messaging system, offered either through the same service provider as that of the subscriber or through another service provider.

Directory: A directory is a collection of information, at least some of which relates to other information, perhaps by way of an index or other relationship. Use of the term directory does not imply any specific architecture or implementation; the important aspect is that the directory fulfill the functions described.

Directory Server: The directory server is the platform holding the database containing the directory. In some embodiments, the directory server may be provisioned directly onto other network elements, such as an AIN SCP. In other embodiments, the directory server may be a server configured to respond to queries from messaging servers in a standard protocol such as an LDAP protocol.

Message: A message is a transmission of information that may be in the form of voice, facsimile, video, e-mail or other data.

Subscriber: A subscriber is a person or entity who receives the benefit of services offered by service providers participating in a region-wide messaging system. The subscriber need not necessarily be the person who actually pays for the services.

Transaction: A transaction is the transfer of a message from one originating device or messaging server (MS) to a destination device such as a telephone or computer or another MS, which may be a different or same type of MS, located in a different or the same region, or operated by a different or the same service provider. The message may be a reply message, a message formulated to go to one or more recipients, a forwarded message (whether fax, another voice mail, video or data), or any other type of message transmitted among the MSs of the region-wide messaging system and intended for review by a desired recipient.

Validated Message: A validated message is a message that may be transferred between and/or among MSs of the region-wide messaging system. In order to determine whether a message is a valid message, any one or combinations of the following conditions may be determined, examined, or both: the identities of the message recipient and sender; the locations of the MSs serving the message recipient and sender; whether regulatory rules allow the proposed message transaction; or whether the recipient's service provider will accept the message. Other conditions and rules for validation may be implemented using methods and systems of the present invention.

Messaging Server: A messaging server (MS) is a platform, including both hardware and software, from which voice mail and other messages and other services involving message transfer, reply, forwarding, etc. are provided to subscribers. The inventions described herein are not restricted to a particular embodiment of voice mail or other messaging server since it is fully intended that different types of voice mail or messaging servers, perhaps operated by respectively different service providers, may be used within and without a region-wide messaging system for messaging transactions.

Exemplary Environment for Exemplary Embodiments

The exemplary embodiments of the present inventions are used, preferably, with a region-wide (or regional) messaging (RWM) system, as described in greater detail below. Nevertheless, the present inventions may be used with any type of messaging system with the appropriate functionality.

The RWM system described herein may allow a subscriber to the messaging system within the region of the service provider to send, receive, forward, and reply to messages, including voice mail messages and Voice Profile for Internet Mail (VPIM) Messages. Subscribers may receive messages from other subscribers and non-subscribers. Subscriber-to-subscriber messaging, however, illustrates the advanced features of the RWM system, which may be available, such as: (1) each subscriber may send a message to another subscriber; (2) each subscriber may reply to a message received from another subscriber; (3) each subscriber may reply to a telephone message received from a non-subscriber by implementing a feature that dials the non-subscriber; and (4) each subscriber may receive and reply to internet voice messages or fax messages.

Exemplary RWM System—FIG. 1

FIG. 1 is a block diagram of an exemplary RWM system 10 (also referred to as a telecommunications messaging network). The network 10 includes a variety of interconnected network elements. A group of such elements includes the plurality of end offices which are indicated as service switching points (SSPs or switches) 12a, 12b, 12c. An SSP typically includes switch functionality, but also includes other functionality so as to communicate with other network elements, and in particular, with Advanced Intelligent Network (AIN) elements. SSP 12a and SSP 12c are each coupled to a subscriber line, which also may be referred to as a line or a calling line. Each SSP 12a, 12b, 12c serves a designated group of lines, and thus, the SSP that serves a particular line may be referred to as its serving switch. The line is typically connected to a piece of terminating equipment including telephones 14, 38. Although telephones 14, 38 are illustrated as the terminating equipment, those skilled in the art will understand that such terminating equipment may include other telecommunications devices including, but not limited to, facsimile machines, computers, modems, etc. End offices may further be coupled through a tandem office (not illustrated), which may be used to connect and switch circuits between and among end offices.

Each active line in an AIN is assigned a ten digit (NPA-NXX-XXXX) line number regardless of whether seven or ten digits are dialed to reach the subscriber. A line number is commonly referred to as a telephone number or a directory number.

SSP 12b is connected by trunks to a voice mail system (VMS) (messaging platform) 15. (These trunks use Signaling System 7 signals for call set-up and other actions.) SSP 12c is connected by SS7 trunks to a voice mail system (VMS) (messaging platform) 17.

SSPs 12a, 12b, 12c are interconnected by a plurality of trunk circuits 18. These are the voice path trunks that connect the SSPs to connect communications. In addition to connections to other elements, each of the SSPs is connected to a local signal transfer point (STP) 20 via respective data links. Currently, these data links employ a signaling protocol referred to as Signaling System 7 (SS7). Much of the intelligence of the AIN resides in a service control point (SCP) 22 that is connected to STP 20 over an SS7 data link. Among the functions performed by the SCP 22 is the maintenance of network databases and subscriber databases as represented collectively by databases (subscriber data) 24.

In order to keep the processing of data and calls as simple as possible, a relatively small set of triggers is defined at the SSPs for each call. A trigger in the AIN is an event associated with a particular call that generates a packet to be sent to an SCP. The SCP queries its databases or service package applications (SPAs) for processing instructions with respect to the particular call. The results are sent back to the SSP in a response from the SCP 22 through STP 20. The return packet includes instructions to the SSP as to how to process the call. The instructions may be to take some special action as a result of a customized calling service or an enhanced feature. In response to the instructions, the SSP moves through the remaining call states, may encounter further triggers, and generates further packets that are used to set up and route the call. Similar devices for routing calls among various local exchange carriers are provided by regional STP (not illustrated) and by regional SCP (not illustrated) which may be connected to STP 20, SCP 22, and/or to the elements described herein through the public switched telephone network (PSTN) 26.

When a messaging subscriber (such as the person or entity using telephone 14) subscribes to a messaging service, an entry or a record is created in a VMS such as VMS 15. Each VMS 15, 17 includes subscriber administration, message retrieval, send, reply, forward, and mailbox maintenance functions, among others. Each VMS 15, 17 includes or is functionally connected respectively to a subscriber profile database 28, 30 (subscriber data). Each subscriber profile database stores subscriber-specific profile information (subscriber information) for retrieval by VMS functions. The VMSs 15, 17 are elements of the messaging system or service. To the protected TCP/IP network(s) 32 described below, each of the messaging platforms 15, 17 look like a valid TCP/IP element. In support of this, the VMSs 15, 17 may be assigned a TCP/IP (or IP) address and/or a domain name. Generally, the TCP/IP or other address or domain name of the VMS 15, 17 may be stored in a region-wide messaging directory (RMD) 25 discussed below, or may be stored on some domain name server (not illustrated) either in the protected TCP/IP network(s) 32, in some other element, or as a separate element. In further support of this TCP/IP capability, the VMSs 15, 17 may also provide operations access to mail administrative destinations, in addition to subscriber messaging mailbox destinations. In addition, each VMS 15 or 17 is an SS7 network element and as such is assigned an identifier such as a directory number, a destination point code (DPC) or the like.

The VMSs 15, 17 communicate with the SSP and the SCP according to the AIN 0.2 Switch—Intelligent Peripheral Interface Generic Requirements—1129-CORE Specification, AINGR: Switch—Intelligent Peripheral Interface (IPI) (A module of AINGR, FR-15); Document Number: GR-1129; Issue Number: 03; Updates: REV01—October 1998; Issue Date: September 1997; Product Type: Industry Requirements and Standards (RS); Component of FR-15, ("GR-1129") which is incorporated herein by reference. This GR-1129 describes the use of a Remote Operations (RO) parameter for indicating the invocation of a supplementary service. The RO parameter may be used to allow the SCP 22 and the VMSs 15, 17 to share information. If the caller or the communication desires to exercise an option of an action other than leaving a message, such as an attempt to contact the subscriber at the different directory number, the caller or communication provides the indication of the action to be taken with respect to the communication. For example, the caller may press "0". In response to receipt of the indication of the action by the VMS 206, a transmitter (not illustrated) of the VMS 206 transmits a message indicating the action to be taken with respect to the communication and indicating a release of the communication by the VMS 206. The message may be an GRU-1129 message including a remote operations (RO) parameter. The RO parameter may include information indicating what action is to be taken with respect to the communication such as a transfer of the communication (away from the VMS 206). This information may be stored in a field of the RO parameter such as a field denominated as an "operation type" field.

In this messaging service, TCP/IP messaging is allowed via a private Transmission Control Protocol/Internet Protocol (TCP/IP) network (protected TCP/IP network(s)) 32. The VMSs 15, 17 through the network 32 may use a Light-weight Directory Access Protocol (LDAP) to communicate with other elements such as a domain name server (not illustrated) and/or directories such as RMD 25 to obtain information with respect to the proper destination/recipient of a message.

An Internet gateway 34 provides secure access between the private TCP/IP network 32 and the Internet 36. The gateway 34 limits the access of VPIM traffic to and from the Internet 36. In addition, the gateway 34 performs authorized LDAP messaging directory lookups to route messages received from the Internet 36.

Advantageously, a subscriber's line number generally may be the subscriber's mailbox number associated with a messaging platform rendering service to the subscriber in the RWM system. In other words, a message addressed to the subscriber may include the subscriber's line number, which may also be the subscriber's mailbox number. Alternatively, the subscriber's mailbox number may relate to some other identifier associated with the subscriber. The subscriber's address may be based on the ten digit directory number (DN) using an International Telecommunications Union (ITV) Standard E.164 compliant address.

FIG. 1 also illustrates the exemplary use of a region-wide messaging directory 25 (RMD or directory) in the messaging system 10. The RMD 25 is functionally connected to the other elements of the messaging system 10 through inclusion in or a connection to the TCP/IP network 32. Although the RMD 25 is illustrated as connected to the system 10 through the TCP/IP network 32, the RMD 25, or course, may be connected to the system 10 in other ways or even be included in an element of the system such as in association with the directories 24 of SCP 22. An RMD provides high-speed directory look-up for messaging subscribers. Generally, an RMD stores information so as to determine which messaging platform of the RWM system serves which subscriber. Additional information on the manner in which the RMDs of the messaging system 10 store information on messaging platforms and subscribers and how RMDs interact with a network element 51 may be obtained from the commonly assigned and owned patent application entitled "Methods and System for Determining Message Routing Based on Elements of a Directory Number", which was filed with the United States Patent and Trademark Office on Dec. 13, 1999 and assigned Ser. No. 09/459,498, and which was filed with the United States Receiving Office pursuant to the Patent Cooperation Treaty (PCT) on Dec. 13, 1999 and assigned Application No. PCT/US99/29491 and which application is herein by reference.

Of course, an RMD may keep track of other information relating to subscribers of the RWM system. In particular, the RMD may act as both a client and a server with respect to the Light-weight Directory Access Protocol (LDAP). The RMD stores subscriber, service, and other messaging data. In addition, the RMD supports the LDAP attributes field for LDAP clients to choose the fields that they desire to retrieve from the server. Clients may retrieve the subscriber profile from the RMD.

Subscriber data may be stored in the RMD in the following exemplary fashion:

| Description/Directory Field | LDAP DN Attribute |
| --- | --- |
| Subscriber's Mailbox Number | CN (Common Name) |
| Name Announcement | Spoken Name |
| MDSBlocking | N/A |

Subscriber data is used to look up subscribers in the RMD. The data is also used for the purposes of routing and billing a subscriber's calls and messages to and from the messaging platforms.

Service data may be stored in the RMD in the following exemplary fashion:

| Description/Directory Field | LDAP DN Attribute |
| --- | --- |
| VMS ID | VMSID |
| VMS DAP Number | VMSDN |
| VMS Domain | Domain |
| VoiceEncoding | N/A |
| LATA | N/A |
| State | N/A |
| StateLATA | N/A |
| LDAP Credentials | Hidden in LDAP query |
| VMS IP address | Hidden in LDAP query |

The service data contains messaging platform-specific information to perform certain checks during directory look-up and call/message routing. The RMD may also store service provider data to ensure that a service provider has access to only its authorized subscribers' information.

Figure 2:
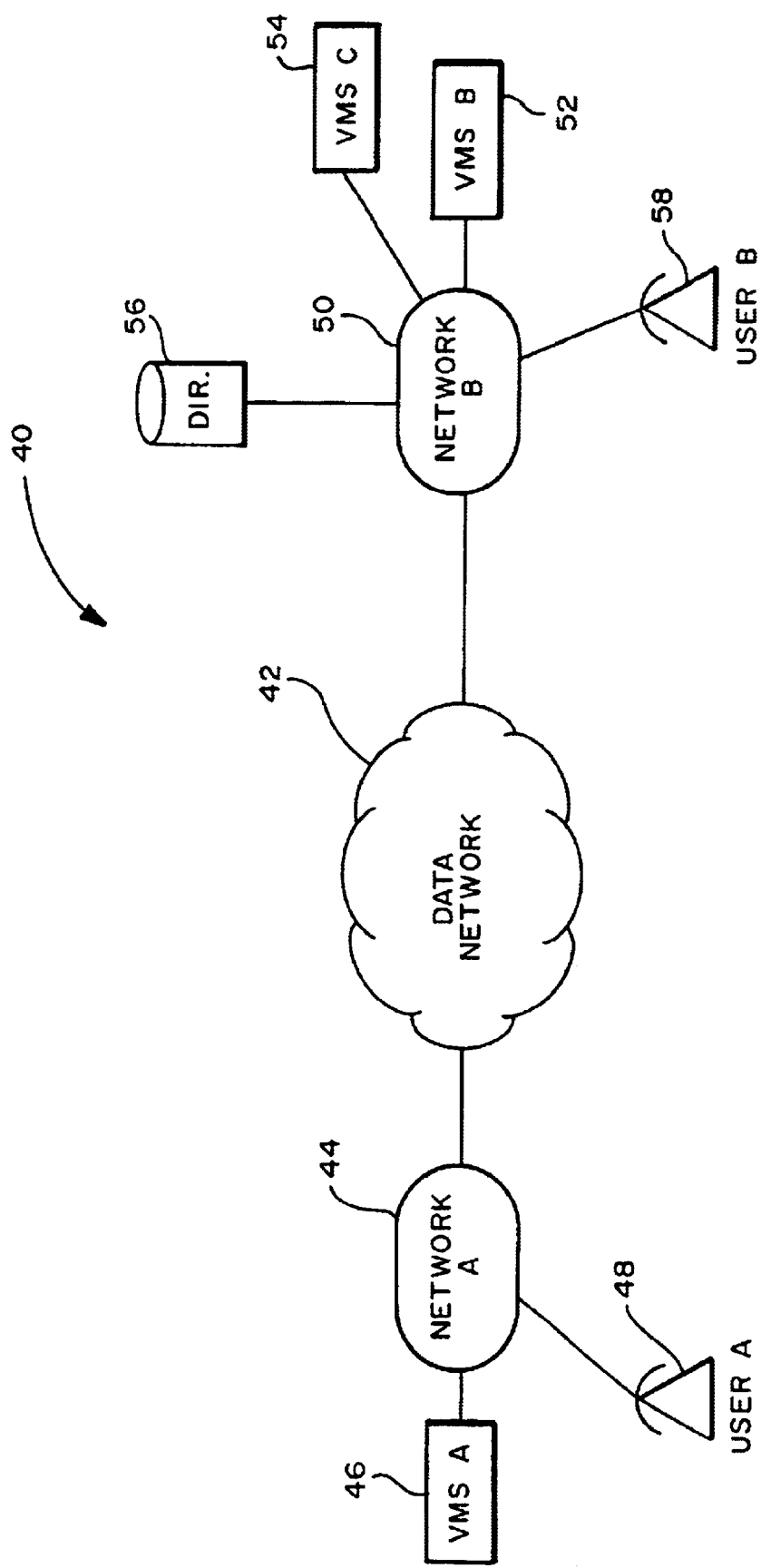
FIG. 2 is a block diagram of another exemplary embodiment of a region-wide messaging system in which the method and system of the present invention may be deployed.

Overview of Exemplary Region-Wide Message (RWM) System and Methods—FIG. 2

Advantageously, the present inventions provide a messaging system and methods such that messages may be exchanged between and among users in the region even though the users subscribe to messaging services from different service providers and/or are provided with messaging services from different VMSs. The RWM system and methods allow for the exchange of such messages between different VMSs by the transmission of such messages through a data network using a standard protocol of the data network.

FIG. 2 illustrates an exemplary RWM system 40 that is simplified from the exemplary RWM system 10 illustrated in FIG. 1 for ease of explanation. Nevertheless, the functionality of the RWM system 10 from FIG. 1 may be found in and used in the RWM system 40 of FIG. 2.

The RWM system 40 of FIG. 2 includes a data network 42, which may be the internet, an intranet, or other data network using at least one standard protocol to transmit messages through the data network. A standard protocol may be the Transmission Control Protocol/Internet Protocol (TCP/IP), the Lightweight Directory Access Protocol (LDAP), which is a TCP/IP-based derivative of the X.500 electronic mail (e-mail) delivery service, Profile for Internet Mail (VPIM) protocol, or the like.

In the exemplary RWM system 40, the data network 42 is connected to a network A 44 such as a segment of the public switched telephone network (PSTN) or similar network. Network A 44 includes a voice mail server (VMS) A 46, which is operated by a service provider to provide messaging services to subscribers such as user A 48.

The data network 42 also is connected to a network B 50, which may be a different segment of the PSTN or similar network from that segment of the PSTN represented by network A 44. Network B 50 includes two voice mail servers (VMSs) 52, 54. In this example, each VMS 52, 54 is operated by a different service provider from the other and from the service provider of VMS 46 in network A 44. Each VMS 52, 54 is operated by its service provider to provide messaging services to a respective group of subscribers. VMS B 52 provides messaging services to user B 58. Network B 50 also includes a directory 56 such as a Regional Messaging Directory (RMD) described above or similar directory. Network B 50 uses directory 56 to determine the address of or other routing information for a message received from the data network 42. In this example, the directory keeps track of which users (telephone numbers, directory numbers, addresses, or the like identifiers) are served by which of the two VMSs 52, 54.

To further understand the advantages of the RWM system 40, consider the example of a voice mail message being transmitted from user A 48 to user B 58. User A 48 calls into his or her voice mail service, which call is routed through network A 44 to VMS A 46, which serves user A 48. The user A 48 creates a voice mail message and indicates its destination as the voice mailbox of user B 58 by providing user B's directory number as a destination number.

In this example, the VMS A 46 prepares a VPIM encoded message including user's A message and transmits the message using VPIM as the standard protocol to the data network 42. The data network 42 routes the message using VPIM as the standard protocol through the data network 42 to network B 50. Upon receipt of the message, network B 50 checks with directory 56 for further routing of the message. This check may solicit an address or other routing information for the message. Alternatively, the network B 50 may not have to consult the directory 56. The network B 50 may include the necessary information to determine further routing of the message, or the network B 50 may not need additional information such as in the case wherein the network only includes a single VMS.

In this example, the directory 56 provides network B 50 with information such as an address that the message is to be routed to VMS B 52 as the VMS serving user B 58 to whom the message is addressed. The network B 50 uses the address obtained from the directory 56 to deliver the message using VPIM as the standard protocol to VMS B 52. The voice mail message from user A 48 is made available for retrieval by user B 58 at VMS B 52. For example, user B 58 as the recipient may call through network B 50 into his or her VMS B 52 to retrieve the message. The voice mail message was successfully transmitted from a VMS associated with a first telecommunications network through a data network to a VMS associated with a second telecommunications network. The sender and recipient may communicate by the exchange of voice mail messages despite the fact that the sender is served by a VMS that is not the same as and is operated by a service provider different from that of the VMS serving the recipient.

Overview of Validation System and Methods

Figure 3:
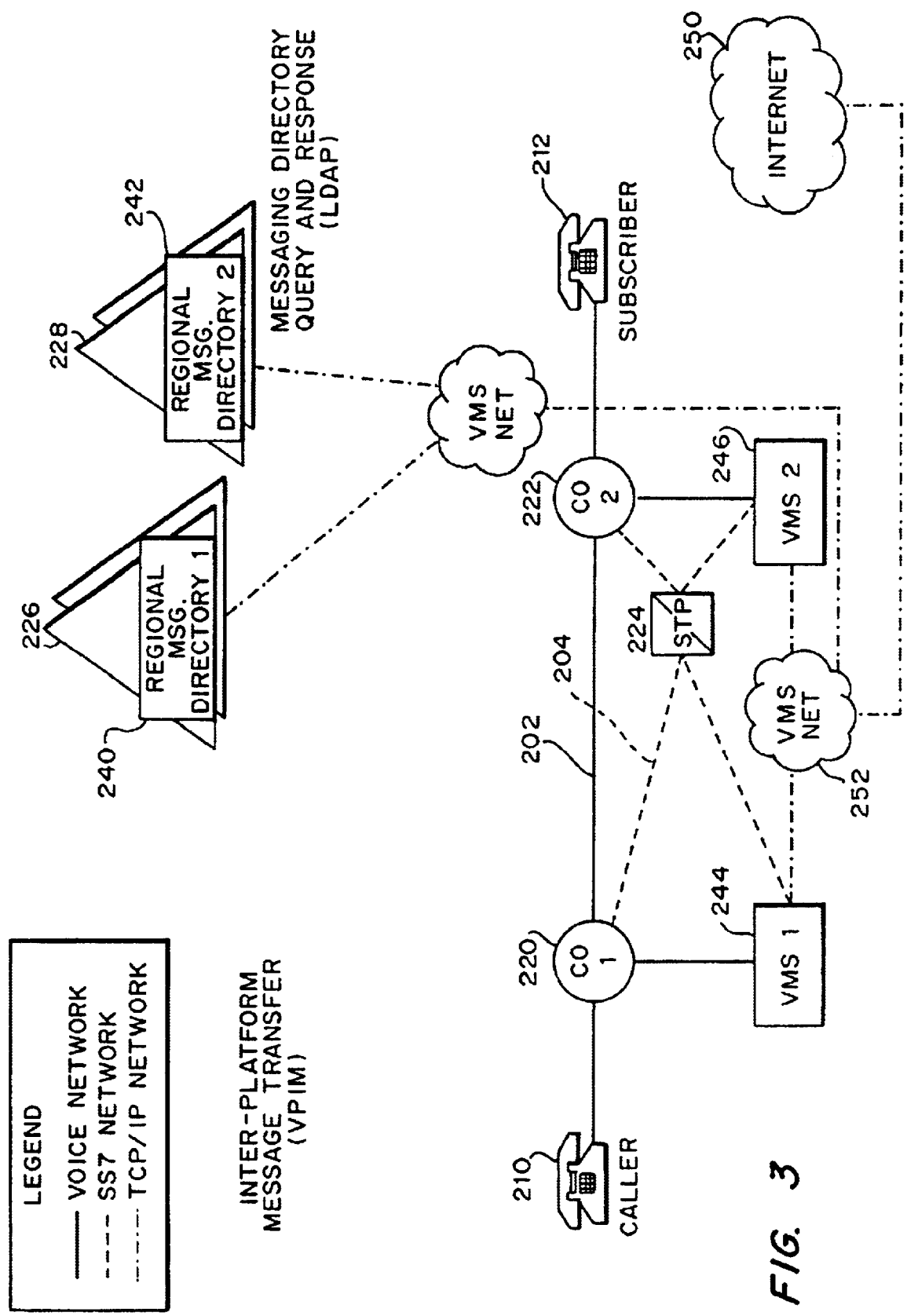
FIG. 3 is a block diagram of and exemplary system for implementing the transaction validation method and system of the present invention.

FIG. 3 shows the deployment of the present invention in a region-wide messaging system 200. The system 200 makes use of network elements like central office switches (i.e., SSPs) 220, 222, STP 224, SCP 226, 228, voice network 202, and SS7 network 204. VMSs 244, 246 are viewed by SS7 network 204 as Intelligent Peripherals and are further coupled by VMS network 252 that is a private TCP/IP network similar to the public internet 250.

FIG. 3 shows that SCPs 226, 228 are each coupled to a regional messaging directory ("RMD") 240, 242, respectively. RMDs 240, 242 may also act as an LDAP server responding to LDAP clients (like VMSs), able to respond to various LDAP queries by replying with the information indicated in the LDAP fields. Generally, RMDs 240, 242 provide a central location for subscriber information management. Initially, the RMDs 240, 242 may store only subscribers' 212 e-mail and SMTP server addresses, but they may contain placeholder attributes or pointers for information presently stored in VMSs 244, 246 such as a subscriber's name announcement (a.k.a. Spoken Name), extended absence greeting indicator and sub-mailboxes. RMDs 240, 242 may be physically deployed on an SCP 226, 228 or, preferably, may reside on a server (computer) and be linked to the SCPs 226, 228 via an appropriate network connection. RMDs 240, 242 may be configured as an Oracle™ database available from the Oracle Corporation deployed on an AIN SCP available from Lucent. Other reliable platforms and databases may be used to implement RMDs, 240, 242, including UNIX-based or WindowsNT servers.

As noted above, each RMD 240, 242 may store various types of information. For example, each RMD 240, 242 stores and maintains subscriber profile information that may consist of the types of information set forth in the exemplary tables above. SCPs 226, 228 access RMDs 240, 242 in order to respond to LDAP messaging queries by providing the information requested by the inquiring VMS 244, 246. This information can include: validation of the number provided by the subscriber, other subscriber information like spoken name, etc. or the addresses of the network element from which such information may be retrieved. Subscriber data is used to look up subscribers in the RMD. The data is also used for the purposes of routing and billing subscriber calls to and from the messaging platforms.

Service data also may be stored in the RMD as illustrated by the tables above. The service data contains messaging platform-specific information to perform certain checks during directory look-up and call routing. The RMD may also store service provider data to ensure that a service provider has access to only its authorized subscribers' information.

The following exemplary tables may be used in each RMD 240, 242, although these tables could be combined with each other or other types of tables and can reside on one or multiple database(s) that may be physically deployed on one or multiple server(s). Additionally, these tables can be linked in various ways using known relational database techniques.

A Subscriber Table stores the information concerning the State and LATA (or other appropriate political, regulatory or geographical area) in which each VMS resides, as well as the service provider operating that VMS.

Subscriber Table I

| Subscriber Identifier | VMS Identifier | Block Flags |
|---|---|---|
| 770-555-1212 | 6110.atlngamm62 [e.g., VMS1 run by BellSouth] | Subscriber in default; subscriber language features. |
| 404-555-1212-02 | 2113.atlngaev63 [e.g., VMS2 run by Evelyn's Voice Mail] | Subscriber authorized for messaging |
| 336-555-1212 | 4331.atlngahh69 [e.g., VMS3 run by Harry's VoiceMail] | Subscriber paid up and authorized |

A VMS State Table below provides the rules governing message transactions across components of the region, such as messages that are transferred inter-state or inter-LATA.

VMS StateTable II

| VMS Identifier | State | Service Provider |
|---|---|---|
| [VMS1] | Georgia | BellSouth |
| [VMS2] | Louisiana | Evelyn's |
| [VMS3] | Alabama | Harry's |
| [VMS4] | North Carolina | ATT |

State/LATA Table III

| State | LATA | Inter-State Transfer Allowed? |
|---|---|---|
| Georgia | 436 | Yes |
| Louisiana | 486 | Yes |
| Alabama | 476 | No |
| North Carolina | 424 | No |

The SPID Table below indexes against the service provider identity certain business agreement rules governing the exchange of data between companies. Without a prearranged agreement with other service providers, it is unlikely that service providers will want to tie up network and VMS resources handling other providers' messages. Also, it is advantageous for service providers to build their own databases of VMS identities in order to avoid the possible need to pay other providers a fee for querying those other databases.

SPID Table IV

| Service Provider | Cooperating Service Providers |
|---|---|
| 9417 [e.g., BellSouth Voice Mail] | 2113 [e.g., Evelyn's Voice Mail] |
| 9417 [e.g., BellSouth Voice Mail] | 0286 [e.g., AT&T Voice Mail] |

Queries may be launched over TCP/IP network 250 using protocols that define the data within messages as well as features for acknowledging message delivery, message delivery failure, or a variety of other conditions caused by a messaging transaction. Multiple methods for query protocol implementation exist, and skilled persons will recognize that query protocols may be formulated from the LDAP specifications.

VMSs 244, 246 may use LDAP for retrieving subscriber profile information. Both RMDs 240, 242 and VMSs 244, 246 may interchangeably act as a LDAP client as well as a directory server. RMDs will support primary and secondary LDAP queries so that initially destination information can come from RMDs 240, 242 (via a primary query) and spoken name and other subscriber information can come from other VMSs (via secondary queries) within the system 200. VMSs 244, 246 may query RMDs 240, 242 for subscriber profile information, essentially acting as a LDAP client. VMSs 244, 246 will request all subscriber attributes, but RMDs 240, 242 will return only usable values for email and SMTP addresses. When VMSs 244, 246 receive the attributes that are unusable values but represent placeholders for such profile information as the spoken name, sub-mailboxes etc., an originating VMS 244, 246 will act as a server, initiating a secondary query to a particular, client VMS for that information. For instance, VMS 244 may act as a LDAP client, retrieving subscriber information like the subscriber's spoken name announcement by querying RMD 240, which either returns the spoken name or returns information indicating VMS 246 retains the subscriber's spoken name. VMS 244 thereafter sends a secondary query via VMS network 252 to VMS 246 to retrieve the stored spoken name.

Figure 4:
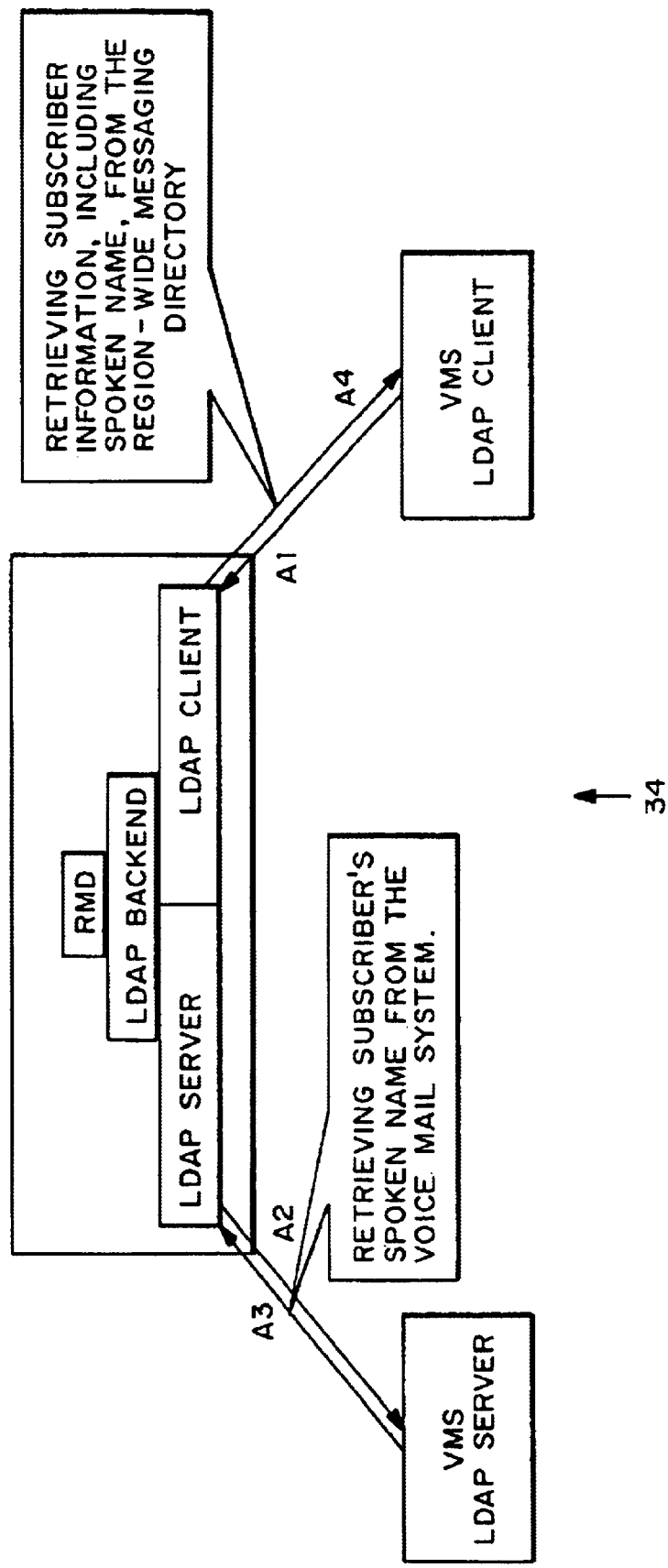
FIG. 4 is a block diagram showing the general network topology associated with retrieval of information from regional messaging databases using LDAP client-server queries.

FIG. 4 shows the general network topology and interrelation between a VMS 246 acting as an LDAP client seeking subscriber information from RMD 240, which in turn queries a VMS 244 acting as an LDAP server to retrieve a spoken name. Alternatively, all subscriber information may be stored in and retrieved from RMDs 240, 242, which may also retrieve subscribers' spoken names directly from VMSs. VMS 244, 246 queries to RMDs 240, 242, may use the domain name scheme described in the AIM2000 Service Deployment Architecture, attached and previously incorporated by reference. Additionally, detailed call flows showing the various LDAP queries and responses among the network elements shown in FIGS. 3 and 4 are described in further detail in the "AIM2000 Service Deployment Architecture (Issue 1.0)" document, attached to the referenced provisional application and previously incorporated by reference.

Using the LDAP query scheme described above, the present invention facilitates VMSs 244, 246 access to subscriber profile information stored in RMDs 240, 242. For instance, when a message is to be delivered among subscribers to system 200, one VMS 244 will query the appropriate RMD, providing the destination and origination addresses (e.g., telephone numbers). The RMD 240 will associate those addresses with the applicable VMS serving those subscribers, which will also provide information concerning the geographic location of the VMS and the service provider operating the VMS. Then, using rules provided within its database, RMD 240 will determine whether regulatory, business or other constraints prohibit a messaging transaction between the identified VMSs of the message sender and recipient.

Message Delivery Services:

Certain subscribers may elect to use a message delivery service that allows subscribers 200 to create a multiple distribution list by which messages can be broadcast to multiple recipients. The distribution list can include other subscribers to regional messaging system 200 and non-subscribers (although the non-subscribers must have at least the traditional voice mail services).

As the subscriber 212 creates the distribution list by inputting various telephone numbers, validation of the proposed messaging transaction to each destination number may be performed. Validation proceeds as follows. Subscriber 212 seeks to send a message to caller 210. Subscriber 212 enters caller 210's telephone number into a message delivery list ("MDL"). VMS 246 receives subscriber 212's entered list, including caller 210's telephone number. VMS 246 queries RMD 242, providing the caller 210's telephone number, as well as information identifying the subscriber 212. The RMD 242 uses the Tables I and II described above to determine the identity of the service provider serving caller 210 and the geographic location of both caller and subscriber.

With the above-described information concerning caller 210 and subscriber 212, RMD 242 is able to apply the rules set forth in the tables within RMD 242 to determine whether a message from subscriber 212 would be allowed. For instance, suppose subscriber 212 were located in Georgia and caller 210 located in Louisiana. Table II informs RMD 242 that an interstate message transfer between VMSs located in Georgia and Louisiana is allowed. The next step is to determine whether the VMSs involved different service providers. Table II informs RMD 242 that subscriber 212's VMS2 is operated by BellSouth and that caller 210's VMS1 by Evelyn's Voice Mail. With that information, RMD 242 examines Table III to determine whether Evelyn's Voice Mail accepts message traffic from BellSouth. It does, so the transaction is validated.

Each number of a regional messaging service subscriber that is entered into the MDL is verified through a similar process. If RMDs 240, 242 determine that state regulations do not allow interstate message traffic (e.g., if a participant in the proposed messaging transaction is in Alabama), the telephone number will not be validated. Or, in another example, if the message transaction is only inter-LATA, it would be allowed in North Carolina, but not Alabama. In yet another example, if the message transaction involves exchange of messages within North Carolina's "424" LATA, the method of the present invention determines such an exchange is allowed by regulation. But if the same transaction involves a recipient whose service providers were, for instance, Harry's VoiceMail, RMD 240, 242 determines from Table III that message exchange with Harry's VoiceMail is not allowed.

Once validation is complete, the subscriber 212 is alerted to the validation by the spoken name confirmation process described below. If a recipient is a non-subscriber 42, an announcement will so indicate, including the non-subscriber's 42 phone number. Thereafter the subscriber 212's VMS may simply store that number for later outdialing and playing of the message, as described below. Typically, a confirmation spoken name may be given for subscriber's 212 and a confirmation telephone number for non-subscribers 3.

When a distribution list is completed and the subscriber 212 orders the message circulated, messages to subscribers 212 are formulated into the VPIM format and sent via the TCP/IP network 252 described above. Messages to non-subscribers 3 will be "outdialed." In other words, messages will be forwarded to the subscriber's 212 local switch-or SSP, such as SSP 222. There, the message encounters a trigger (e.g., a TAT or Terminating Attempt Trigger) that makes the SSP 222 query the SCP 228 for the destination of non-subscriber 42 indicated in the list. This is a billing mechanism that is also used for flexible call forwarding features that is described in U.S. Pat. No. 5,991,377 that is owned by the assignee of the present invention and which is hereby incorporated in its entirety by this reference. SSP 222 thereafter dials an actual call, connecting the subscriber's VMS to the non-subscriber's voice mailbox so that the recorded message may be played and recorded in the non-subscriber's voice mail. In order to be compatible with caller ID services, the calling number field will display an appropriate name, like "[Name of the Messaging Service Provider] Messaging." Alternatively, the messaging service provider may itself route the call, selecting the route and carrier. Note that because non-subscriber messages are outdialed via a normal telecommunications call, they are not subject to the regulatory and business constraints for messaging traffic and will not need to be validated against those conditions.

Message Replies and Forwarding:

In FIG. 3, a caller 210 sends a message to a subscriber 212. Caller 210 either calls subscriber 212's voice mailbox to leave a message or caller 210 originates a message in VMS 244 that ultimately is intended for subscriber 212's voice mailbox on VMS 246. Subscriber 212 receives the message and desires to formulate a reply to the caller 210.

Replies to Other Subscribers:

While the subscriber 212 listens to caller 210's message, VMS 244 queries SCP 226 to determine whether the caller 210 receives voice mail services from a service provider participating in regional messaging system 200. The VMS 244 query sends to the SCP 226 the caller 210's telephone number and the subscriber 212's telephone number. VMS 244, of course, stores subscriber 212's telephone number.

The present invention, using the process and system described above, will discern the service provider, LATA, and State of each party to the proposed transaction. Thus, the subscriber 212's VMS 246 queries the RMD 242 using LDAP queries forwarded over the VMS network 252 to ascertain the location of the VMS operating the recipient's voice mail service and the service provider operating that VMS. RMD 240, 242 will then apply the applicable regulatory constraints or business constraints stored in various tables, such as tables I through III above, to determine the validity of going forward with the proposed reply transaction.

If the caller 210 subscribes to voice mail services that accept messages generated by regional messaging system 200 and if the proposed transaction is validated by either of the RMDs 240, 242, VMS 244 offers the caller 210 the option of replying to the message. For instance, VMS 244 can play a voice message to caller 210, such as "Enter '1' if you wish to formulate and send a reply to this message?" If the caller 210 opts to reply, a confirmation name announcement, described below, may be played.

Replies to Non-Subscribers:

Replies to non-subscribers need not be validated on regulatory and business agreement grounds, although there will have been an earlier validation query that confirms the destination is not to a subscriber. In that case, RMDs 240, 242 need not be further queried to determine the destination of the reply.

Instead, the subscriber 212's VMS 246 simply stores calling line identification ("CLID") information available when the non-subscriber calls to leave a message in subscriber 212's voice mailbox. If the CLID information is not designated as private, VMS 246 will play the telephone number as confirmation of the non-subscriber recipient. In any event, either after or during composition of the message, VMS 246 causes an actual call to be outdialed to the non-subscriber, as described above, through the subscriber 212's serving SSP 222 directly to the designated number so the message may be left.

Confirmation Name Announcement:

Accurate delivery of messages is important to voice mail subscribers 200, who do not wish possibly confidential messages to be misrouted. To decrease subscriber 212 error in identifying message recipients, when a subscriber 212 chooses the reply option, the subscriber's VMS 246 plays a confirmation of the reply destination, called the confirmation name announcement.

If subscriber 212 chooses to reply to a message from caller 210 by entering the appropriate code or otherwise indicating that choice, VMS 246 queries the SCP 228 to retrieve the original caller 210's spoken name. Assuming caller 210 subscribers to system 200, SCP 228, in turn, accesses the RMD 242 to retrieve either the caller 210's spoken name or a pointer that identifies to VMS 246 the appropriate VMS messaging platform (e.g., VMS 244) to query for that spoken name. If the spoken name resides on a different VMS, VMS 246 is so informed by a reply LDAP message from SCP 226. Thereafter, VMS 244 launches another query to VMS 246 to retrieve the caller 210's spoken name. The spoken name is played to the subscriber 212 as confirmation that the reply will be forwarded to the intended recipient. Upon hearing the name, the subscriber 212 records the reply message. When the reply message is complete, the subscriber 212 so signals VMS 246 via entry of the appropriate codes. VMS 246 packages the reply and routes it back to the caller 210's VMS 244 using the information retrieved via SCP 226 from RMD 228.

If the calling name is unavailable, the messaging system 200 should play the calling number, if available, or other appropriate announcement to confirm the subscriber 212's choice. For instance, a text-to-speech rendering may be made of the caller 210's text-stored name or the originating number of the caller 210 may be provided to the subscriber 212 in order to inform the subscriber 212 of the identity of the message's recipient, caller 210.

Other Features:

The preferred embodiment of the regional messaging system 200 described above for use with the present invention supports the use of messaging to "sub-mailboxes." Sub-mailboxes are multiple mailboxes that can be accessed by dialing a single telephone number and then selecting a code that identifies a particular mailbox. For instance, a sub-mailbox may be identified by an additional number (00, 01, 02, etc.) associated with the main telephone number. Users control uses of submailboxes and may change which boxes are used for which users. If a subscriber attempts to send a message to a submailbox (either through the reply or message distribution options), the LDAP query process described above will be used to determine whether the submailbox exists. Subscribers will be informed if that mailbox is invalid.

The preferred regional messaging system 200 in which the present invention may be deployed accepts facsimile messages and stores them in a particular subscriber's VMS 244, 246. Facsimile data in certain protocols (like Group 3 fax messages) can be stored, forwarded to an appropriate printer or computer for written display or annotated. Facsimile messages may be forwarded like other messages using the same general process described above. When the subscriber 212 chooses a forwarding address involving a toll payment, the procedure described above may first be used to determine the location of the VMS serving that number. Other databases deployed at the RMD 240, 242 or the subscriber's VMS 244, 246 may determine whether that location will incur toll charges and an appropriate announcement may be played so notifying the subscriber 212.

Subscribers, in setting up their accounts, may be offered the option of associating a facsimile number with the subscriber's mailbox number. This allows such subscribers to receive voice replies to facsimile messages. Those replies may be made by generally following the same process used to determine if a reply to a voice message may be made. Thus, the VMS 244, 246 determines whether the RMD 240, 242 lists the calling number associated with the facsimile number that was appended to the facsimile message left in the subscriber's voice mail. If there is an associated calling number, the subscriber retrieving or re-directing a facsimile message is offered the option of voice replying to the originator's mailbox.

RMDs 240, 242 may be implemented so that, as part of the profile information, it stores the spoken name of each subscriber to affiliated providers' services. In that case, the third party service providers may accept messages from the regional messaging system 200 by simply configuring their VMS to process messages that are in the appropriate format, such as the VPIM format described above. In other words, storing the spoken name at RMDs 240, 242 allows providers to more easily configure their voice mail systems to accept messages generated by system 200.

Alternative Implementations and Embodiments

The present invention can also be deployed over other existing network, including a TCP/IP network. For instance, the present invention can be deployed over the internet. That can be accomplished by having users associate with their phone numbers their e-mail addresses. When a particular user desires to forward a message to another user part of the regional messaging system, the user's messaging server can utilize the process of the present invention to launch queries to the directory to determine whether or not the recipient is also participating in the region-wide messaging system. By retrieving the recipient's IP address (e.g., e-mail address), the present invention can thereafter formulate the originating subscriber's message and send it as a file attachment via e-mail to the message recipient. The e-mail attachment can be either an audio link or a transcript of the originating party's voice message. Such a transcript can be prepared using commercially available voice-to-text conversion software, which can be deployed on the same platform that holds the directory information.

Having described a preferred embodiment of a system and method for validating messaging transactions, those skilled in the art will recognize various modifications, adaptations, and alternative embodiments thereof. For instance, while this document and certain concurrently filed attachments that are incorporated by reference describe one embodiment of a region-wide messaging system, this invention can be adapted for use in other implementations of a region-wide messaging system. Further, while liberalization of regulations in the U.S. or other, non-U.S. countries may render moot the need to check upon whether regulations allow a particular messaging transaction, the present invention may be adapted to perform other validation queries. Finally, the invention is further defined by the following claims:

What is claimed is:

1. A method for validating messaging transactions between customers served by voice mail servers located in different geographic regions, operated by different service providers, or both, the method comprising:

creating a messaging directory with information on characteristics of respective voice mail servers;

querying the messaging directory to identify a first voice mail server associated with a caller originating a message and a second voice mail server associated with the recipient of the message; and based on the identities of the first and second voice mail servers, causing the messaging directory to check the respective characteristics of the two voice mail servers to determine whether the message may be transferred between the first and second voice mail servers.

2. A method according to claim 1 wherein the querying involves using the identities of the first and second voice mail servers to determine (i) their locations, (ii) the identity of the one or more service provider(s) operating the first or second voice mail server or (iii) both the locations of the first and second voice mail servers and the identity of the one or more service provider(s) operating the first or second voice mail servers.

3. A method according to claim 2 wherein the querying is performed by providing the messaging directory with at least the message recipient's telephone number correlated to at least the identities of one of the first or second voice mail servers.

4. A method according to claim 3 wherein the providing is implemented by formulating a query to the messaging directory and transmitting the query over a network.

5. A method according to claim 4 wherein the determining involves using the location of the first or second voice mail server to determine whether applicable regulatory rules allow message transactions between those locations.

6. A method according to claim 1 wherein the determining step involves determining whether the message transaction may proceed if the identities of the service providers operating the first and second voice mail servers are different.

7. A process for determining the identity of a first voice mail server associated with an originating caller that has left a message with a second voice mail server associated with a receiving caller that may seek to respond to the message, the process comprising;

ascertaining an identifier associated with the originating caller;

using the identifier to determine an identity code that identifies the first voice mail server;

using the identity code to determine information including the location of the first voice mail server, the identity of the service provider operating the first voice mail server, and the existence of agreements between the first service provider and other service providers; and using the information to determine whether the receiving caller may communicate with the first voice mail server in response to the message.

8. A method for validating the passage of data between customers of different companies operating messaging servers that serve different areas, the method comprising:

causing a messaging directory to include information relating to the passage of data between customers of different companies operating messaging servers that serve different areas; and causing the messaging directory to use the information including business rules, regulatory rules or both to determine whether the data may be passed between the customers' messaging servers.

9. A method according to claim 8 further comprising identifying the voice mail servers involved in the passage of the data.

10. A method according to claim 9 further comprising using the identities of the voice mail servers to determine their respective locations, their respective operating service providers or both.

11. A method according to claim 10 further comprising applying regulatory rules to determine whether the data may be passed between the identified voice mail servers.

12. A method according to claim 11 further comprising determining whether the operating service providers will accept data from one another.

13. A method according to claim 12 further comprising confirming to the customer the destination of the data or message.

14. A method according to claim 8 further comprising out-dialing a telephone call to a person not subscribing to regional messaging services in order to deliver a message.

* * * * *